(No Model.)
N. WASHBURN.
CAR WHEEL.
No. 326,256. Patented Sept. 15, 1885.
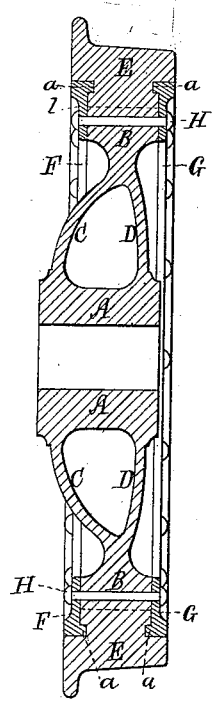
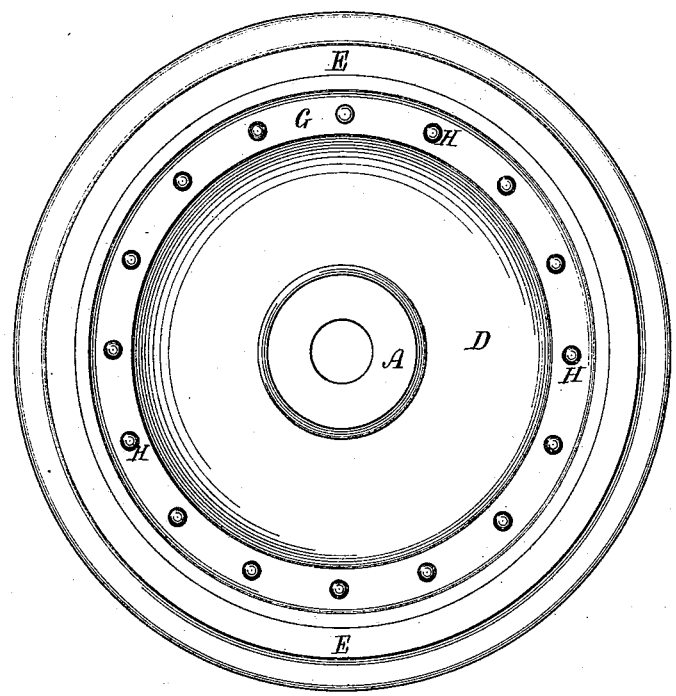
Witnesses.
S. N. Piper
E. B. Pratt
Inventor.
Nathan Washburn.
by R. H. Eddy atty.

UNITED STATES PATENT OFFICE.

NATHAN WASHBURN, OF BOSTON, MASSACHUSETTS.

CAR-WHEEL.

SPECIFICATION forming part of Letters Patent No. 326,256, dated September 15, 1885.

Application filed October 1, 1884. Renewed August 10, 1885. (No model.)

*To all whom it may concern:*

Be it known that I, NATHAN WASHBURN, of Boston, (Allston,) in the county of Suffolk, of the Commonwealth of Massachusetts, have invented a new and useful Improvement in Railway Car-Wheels; and I do hereby declare the same to be described in the following specification, and represented in the accompanying drawings, of which—

Figure 1 is an outer side view, and Fig. 2 a transverse section, of a wheel made in accordance with my invention, the nature of which is defined in the claim hereinafter presented.

The improvement relates, specially, to the kind of railway car-wheel that is shown in the United States Patent No. 279,446, dated June 12, 1883, and granted to me, the said wheel having a hub, a rim, and two annular plates connecting them, cast in one piece and against two flat rings arranged on opposite sides of the rim and connected by a series of bolts. In making the said wheel the tire in a sufficiently heated state, and the rings and their connecting-bolts duly arranged, were placed within a mold for founding the rim, hub, and their two connecting-plates, after which the metal to compose the said rim, plates, and hub may run into the mold and against the tire and between and against the rings and about their connecting-bolts, in which case the rings and bolts were wholly within the rim, and in no respect were the rings within the tire, as they are in my present wheel, in which the tire is not only united to the rim by welding the two in the process of casting the rim against the tire, but is further held to the rim by two rings flanged on their inner faces and next their outer circumferences. The said rings and their flanges extend within the tire and project on and beyond the rim, and have their connecting-bolts going through it and them.

In the United States Patent No. 292,882, dated February 5, 1884, and granted to me, a wheel is shown as having a steel tire simply shrunk or placed on the rim and held to it by flanged plates or bolts. In this wheel the hub, rim, and one side plate only were cast in one piece, the other side plate being of wrought-iron. The flanged rings were applied to the tire after it was placed on the rim. Although in this wheel the tire was kept in place by the flanged rings, it was not welded to the rim, as it is in my present improved wheel.

In the drawings, the wheel-hub is shown at A, the rim at B, their connecting-plates at C and D, the tire at E, the flanged rings at F and G, their connecting-bolts at H, and flanges at $a$.

In making this wheel the tire, at a suitable temperature for welding it to the rim in the process of casting the latter, is placed within the mold, and the rim, hub, and their connecting-plates are cast within the tire, the rim joining the tire by being welded to it in the process of founding the said rim. After the tire and rim have thus been joined the flanged rings are to be applied to them and connected to the rim by the rivets going through it and such rings, all being substantially as represented. Thus it will be seen that in my improved wheel the tire is not only connected to the rim by being welded thereto, but by the flanged rings secured to the rim by bolts and extended into the tire in a manner to cause their flanges to aid in preventing it from breaking apart and away from the rim.

In Fig. 2 the junction of the tire with the rim is indicated by the dotted lines $l$.

The wheel constructed in my improved way is a very durable and safe one, as its tire is held to the rim in a manner to prevent their separation or the breakage of the tire under most if not all strains to which the wheel in practice may be subjected.

I claim—

The improved car-wheel, substantially as described, as made with its tire welded to the rim and connected therewith by two flanged rings extended with their flanges into the tire, and placed against opposite sides of the rim and connected to it by bolts going through it and them, all being substantially as set forth.

NATHAN WASHBURN.

Witnesses:
R. H. EDDY,
E. B. PRATT.